United States Patent
Wheelock

(10) Patent No.: US 9,846,255 B2
(45) Date of Patent: Dec. 19, 2017

(54) REVERSE SEMI-AIRBORNE ELECTROMAGNETIC PROSPECTING

(71) Applicant: Brent D. Wheelock, Houston, TX (US)

(72) Inventor: Brent D. Wheelock, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 583 days.

(21) Appl. No.: 14/175,746

(22) Filed: Feb. 7, 2014

(65) Prior Publication Data

US 2014/0312905 A1    Oct. 23, 2014

Related U.S. Application Data

(60) Provisional application No. 61/814,589, filed on Apr. 22, 2013.

(51) Int. Cl.
*G01V 3/16* (2006.01)
*G01V 3/17* (2006.01)
*G01V 3/165* (2006.01)

(52) U.S. Cl.
CPC .............. *G01V 3/17* (2013.01); *G01V 3/165* (2013.01)

(58) Field of Classification Search
CPC . G01V 3/12; G01V 3/083; G01V 3/17; G01V 3/165
USPC .................................................. 324/330, 331
See application file for complete search history.

(56) References Cited

U.S. PATENT DOCUMENTS

| | | | |
|---|---|---|---|
| 4,686,474 A * | 8/1987 | Olsen | G01V 3/165 324/331 |
| 4,742,305 A | 5/1988 | Stolarczyk | |
| 4,792,761 A | 12/1988 | King et al. | |
| 4,831,383 A | 5/1989 | Ohnishi et al. | |
| 4,875,015 A | 10/1989 | Ward | |
| 5,050,129 A | 9/1991 | Schultz | |

(Continued)

FOREIGN PATENT DOCUMENTS

| | | |
|---|---|---|
| GB | 2 402 745 | 8/2005 |
| GB | 2 410 635 | 12/2006 |

(Continued)

OTHER PUBLICATIONS

Ito, T. et al. (2009), "Grounded electrical-source airborne transient electromagnetic (GREATEM) survey of Mount Bandai, northeastern Japan," *Exploration Geophysics* 40(1), pp. 1-6.

(Continued)

*Primary Examiner* — Reena Aurora
(74) *Attorney, Agent, or Firm* — ExxonMobil Upstream Research Company-Law Department

(57) ABSTRACT

Method for semi-airborne electromagnetic prospecting for hydrocarbons or other fluids or minerals. In the method, electromagnetic receivers are deployed on the Earth's surface over a subsurface region (71). An airborne electromagnetic transmitter is flown over the receivers (72) and the receivers record at least one component of electromagnetic field data excited by the transmitter (73). The recorded electromagnetic data are analyzed for subsurface resistivity (74), and the resistivity is interpreted for evidence of hydrocarbons or other fluids or minerals (75). Compared to traditional fully airborne surveys, the advantages of the method include better signal-to-noise, and data for multiple source-receiver offsets.

10 Claims, 4 Drawing Sheets

(56) References Cited

U.S. PATENT DOCUMENTS

| | | | |
|---|---|---|---|
| 5,175,500 A | 12/1992 | McNeill | |
| 5,189,644 A | 2/1993 | Wood | |
| 5,210,691 A | 5/1993 | Freedman et al. | |
| 5,265,192 A | 11/1993 | McCormack | |
| 5,357,893 A | 10/1994 | Ruffa | |
| 5,373,443 A | 12/1994 | Lee et al. | |
| 5,406,206 A | 4/1995 | Safinya et al. | |
| 5,467,018 A | 11/1995 | Ruter et al. | |
| 5,563,513 A | 10/1996 | Tasci et al. | |
| 5,594,343 A | 1/1997 | Clark et al. | |
| 5,610,523 A | 3/1997 | Elliot | |
| 5,629,626 A * | 5/1997 | Russell | G01V 3/08 324/226 |
| 5,706,194 A | 1/1998 | Neff et al. | |
| 5,764,515 A | 6/1998 | Guerillot et al. | |
| 5,770,945 A | 6/1998 | Constable | |
| 5,825,188 A | 10/1998 | Montgomery et al. | |
| 5,835,883 A | 11/1998 | Neff et al. | |
| 5,841,733 A | 11/1998 | Bouyoucos et al. | |
| 5,884,227 A | 3/1999 | Rabinovich et al. | |
| 5,905,657 A | 5/1999 | Celniker | |
| 6,037,776 A | 3/2000 | McGlone | |
| 6,049,760 A | 4/2000 | Scott | |
| 6,088,656 A | 7/2000 | Ramakrishnan et al. | |
| 6,094,400 A | 7/2000 | Ikelle | |
| 6,101,448 A | 8/2000 | Ikelle et al. | |
| 6,115,670 A | 9/2000 | Druskin et al. | |
| 6,138,075 A | 10/2000 | Yost | |
| 6,181,138 B1 | 1/2001 | Hagiwara et al. | |
| 6,253,100 B1 | 6/2001 | Zhdanov | |
| 6,253,627 B1 | 7/2001 | Lee et al. | |
| 6,256,587 B1 | 7/2001 | Jericevic et al. | |
| 6,278,948 B1 | 8/2001 | Jorgensen et al. | |
| 6,304,086 B1 | 10/2001 | Minerbo et al. | |
| 6,311,132 B1 | 10/2001 | Rosenquist et al. | |
| 6,332,109 B1 | 12/2001 | Sheard et al. | |
| 6,339,333 B1 | 1/2002 | Kuo | |
| 6,393,363 B1 | 5/2002 | Wilt et al. | |
| 6,424,918 B1 | 7/2002 | Jorgensen et al. | |
| 6,430,507 B1 | 8/2002 | Jorgensen et al. | |
| 6,466,021 B1 | 10/2002 | MacEnany | |
| 6,470,274 B1 | 10/2002 | Mollison et al. | |
| 6,476,609 B1 | 11/2002 | Bittar | |
| 6,493,632 B1 | 12/2002 | Mollison et al. | |
| 6,502,037 B1 | 12/2002 | Jorgensen et al. | |
| 6,529,833 B2 | 3/2003 | Fanini et al. | |
| 6,533,627 B1 | 3/2003 | Ambs | |
| 6,534,986 B2 | 3/2003 | Nichols | |
| 6,593,746 B2 | 7/2003 | Stolarczyk | |
| 6,594,584 B1 | 7/2003 | Omeragic et al. | |
| 6,671,623 B1 | 12/2003 | Li | |
| 6,675,097 B2 | 1/2004 | Routh et al. | |
| 6,686,736 B2 | 2/2004 | Schoen et al. | |
| 6,711,502 B2 | 3/2004 | Mollison et al. | |
| 6,724,192 B1 | 4/2004 | McGlone | |
| 6,739,165 B1 | 5/2004 | Strack | |
| 6,765,383 B1 | 7/2004 | Barringer | |
| 6,813,566 B2 | 11/2004 | Hartley | |
| 6,816,787 B2 | 11/2004 | Ramamoorthy et al. | |
| 6,842,006 B2 | 1/2005 | Conti et al. | |
| 6,842,400 B2 | 1/2005 | Blanch et al. | |
| 6,846,133 B2 | 1/2005 | Martin et al. | |
| 6,876,725 B2 | 4/2005 | Rashid-Farrokhi et al. | |
| 6,883,452 B1 | 4/2005 | Gieseke | |
| 6,888,623 B2 | 5/2005 | Clements | |
| 6,901,029 B2 | 5/2005 | Raillon et al. | |
| 6,901,333 B2 | 5/2005 | Van Riel et al. | |
| 6,914,433 B2 | 7/2005 | Wright et al. | |
| 6,950,747 B2 | 9/2005 | Byerly | |
| 6,957,708 B2 | 10/2005 | Chemali et al. | |
| 6,958,610 B2 | 10/2005 | Gianzero | |
| 6,985,403 B2 | 1/2006 | Nicholson | |
| 6,993,433 B2 | 1/2006 | Chavarria et al. | |
| 6,999,880 B2 | 2/2006 | Lee | |
| 7,002,349 B2 | 2/2006 | Barringer | |
| 7,002,350 B1 | 2/2006 | Barringer | |
| 7,023,213 B2 | 4/2006 | Nichols | |
| 7,035,525 B2 | 4/2006 | Weeks et al. | |
| 7,062,072 B2 | 6/2006 | Anxionnaz et al. | |
| 7,092,315 B2 | 8/2006 | Olivier | |
| 7,109,717 B2 | 9/2006 | Constable | |
| 7,113,869 B2 | 9/2006 | Xue | |
| 7,114,565 B2 | 10/2006 | Estes et al. | |
| 7,116,108 B2 | 10/2006 | Constable | |
| 7,126,338 B2 | 10/2006 | MacGregor et al. | |
| 7,142,986 B2 | 11/2006 | Moran | |
| 7,187,569 B2 | 3/2007 | Sinha et al. | |
| 7,191,063 B2 | 3/2007 | Tompkins | |
| 7,203,599 B1 | 4/2007 | Strack et al. | |
| 7,227,363 B2 | 6/2007 | Gianzero et al. | |
| 7,250,768 B2 | 7/2007 | Ritter et al. | |
| 7,257,049 B1 | 8/2007 | Laws et al. | |
| 7,262,399 B2 | 8/2007 | Hayashi et al. | |
| 7,262,602 B2 | 8/2007 | Meyer | |
| 7,307,424 B2 | 12/2007 | MacGregor et al. | |
| 7,328,107 B2 | 2/2008 | Strack et al. | |
| 7,337,064 B2 | 2/2008 | MacGregor et al. | |
| 7,347,271 B2 | 3/2008 | Ohmer et al. | |
| 7,356,412 B2 | 4/2008 | Tompkins | |
| 7,362,102 B2 | 4/2008 | Andreis | |
| 7,382,135 B2 | 6/2008 | Li et al. | |
| 7,400,977 B2 | 7/2008 | Alumbaugh et al. | |
| 7,411,399 B2 | 8/2008 | Reddig et al. | |
| 7,453,763 B2 | 11/2008 | Johnstad | |
| 7,456,632 B2 | 11/2008 | Johnstad et al. | |
| 7,477,160 B2 | 1/2009 | Lemenager et al. | |
| 7,482,813 B2 | 1/2009 | Constable et al. | |
| 7,483,792 B2 | 1/2009 | MacGregor et al. | |
| 7,502,690 B2 | 3/2009 | Thomsen et al. | |
| 7,536,262 B2 | 5/2009 | Hombostel et al. | |
| 7,542,851 B2 | 6/2009 | Tompkins | |
| 7,565,245 B2 | 7/2009 | Andreis et al. | |
| 7,659,721 B2 | 2/2010 | MacGregor et al. | |
| 7,660,188 B2 | 2/2010 | Meldahl | |
| 7,683,625 B2 | 3/2010 | Milne et al. | |
| 7,805,250 B2 | 9/2010 | Colombo et al. | |
| 7,822,552 B2 | 10/2010 | Bittleston | |
| 7,884,612 B2 | 2/2011 | Conti | |
| 7,928,732 B2 | 4/2011 | Nichols | |
| 7,987,074 B2 | 7/2011 | Carazzone et al. | |
| 8,008,920 B2 | 8/2011 | Lu et al. | |
| 8,014,988 B2 | 9/2011 | Wahrmund et al. | |
| 8,078,404 B2 | 12/2011 | Sjolie et al. | |
| 8,095,345 B2 | 1/2012 | Hoversten | |
| 8,099,239 B2 | 1/2012 | MacGregor et al. | |
| 2002/0043976 A1 | 4/2002 | Holladay, III et al. | |
| 2002/0172329 A1 | 11/2002 | Rashid-Farrokhi et al. | |
| 2005/0128874 A1 | 6/2005 | Herkenhoff et al. | |
| 2005/0237063 A1 | 10/2005 | Wight et al. | |
| 2006/0186887 A1 | 8/2006 | Strack et al. | |
| 2007/0280047 A1 | 12/2007 | MacGregor et al. | |
| 2007/0288211 A1 | 12/2007 | MacGregor et al. | |
| 2008/0007265 A1 | 1/2008 | Milne et al. | |
| 2008/0008920 A1 | 1/2008 | Alexandrovichserov et al. | |
| 2008/0029420 A1 | 2/2008 | Tong | |
| 2008/0105425 A1 | 5/2008 | MacGregor et al. | |
| 2008/0106265 A1 | 5/2008 | Campbell | |
| 2009/0005997 A1 | 1/2009 | Willen | |
| 2009/0083006 A1 | 3/2009 | Mackie | |
| 2009/0204330 A1 | 8/2009 | Thomsen et al. | |
| 2009/0243613 A1 | 10/2009 | Lu et al. | |
| 2009/0254320 A1 | 10/2009 | Lovatini et al. | |
| 2009/0265111 A1 | 10/2009 | Helwig et al. | |
| 2009/0306900 A1 | 12/2009 | Jing et al. | |
| 2009/0309599 A1 | 12/2009 | Ziolkowski | |
| 2010/0014384 A1 | 1/2010 | Colombo et al. | |
| 2010/0017131 A1 | 1/2010 | Glinsky et al. | |
| 2010/0017132 A1 | 1/2010 | Glinsky et al. | |
| 2010/0085055 A1 | 4/2010 | Barsukov et al. | |
| 2010/0179761 A1 | 7/2010 | Burtz et al. | |
| 2010/0225322 A1 * | 9/2010 | Kramer | G01V 3/30 324/339 |
| 2010/0244843 A1 | 9/2010 | Francesca Spiotta | |

(56) References Cited

U.S. PATENT DOCUMENTS

2011/0098929 A1 4/2011 Tabanou et al.
2011/0098996 A1 4/2011 Nichols et al.
2013/0185033 A1 7/2013 Tompkins et al.

FOREIGN PATENT DOCUMENTS

| WO | WO 1998/07050 | 2/1998 |
|---|---|---|
| WO | WO 2004/109338 | 12/2004 |
| WO | WO 2005/085909 | 9/2005 |
| WO | WO 2006/052145 | 5/2006 |
| WO | WO 2006/073315 | 7/2006 |
| WO | WO 2006/135568 | 12/2006 |
| WO | WO 2008/008124 | 1/2008 |
| WO | WO 2008/033184 | 3/2008 |
| WO | WO 2008/054880 | 5/2008 |
| WO | WO 2008/062024 | 5/2008 |
| WO | WO 2008/085063 | 7/2008 |
| WO | WO 2011/050139 | 4/2011 |
| WO | WO 2012/129654 | 10/2012 |

OTHER PUBLICATIONS

Newman, G.A. et al. (1995), "Frequency-doman modeling of airborne electromagnetic responses using staggered finite differences," *Geophysical Prospecting* 43, pp. 1021-1042.

Newman, G.A. et al. (2010), "Imaging CSEM data in the presence of electrical anisotropy," *Geophysics* 75, pp. F51-F61.

Smith, R.S. et al. (2001), "A comparison of data from airborne, semi-airborne, and ground electromagnetic systems," *Geophysics* 66(5), pp. 1379-1385.

Valleau, n. C. (2000), "HEM data processing—a practical overview," *Exploration Geophysics* 31, pp. 584-594.

* cited by examiner

REVERSE SEMI-AIRBORNE ELECTROMAGNETIC PROSPECTING

CROSS-REFERENCE TO RELATED APPLICATION

This application claims the benefit of U.S. Provisional Patent Application 61/814,589, filed Apr. 22, 2013, entitled REVERSE SEMI-AIRBORNE ELECTROMAGNETIC PROSPECTING, the entirety of which is incorporated by reference herein.

FIELD OF THE INVENTION

This disclosure relates generally to the field of geophysical prospecting and, more particularly, to electromagnetic prospecting. More specifically, the disclosure concerns a fly-over method for electromagnetic prospecting for hydrocarbons or detection of other fluids or minerals.

BACKGROUND OF THE INVENTION

1. Technical Problem Solved by the Invention

For the case of shallow hydrocarbons such as the oil sands in Alberta, Canada, a technique is sought that will map edges, depth extent, and grade (saturation) of a shallow reservoir layer. In this environment, the reservoir layer is manifested in electrical parameters as a resistive anomaly (more resistive than the non-reservoir surroundings) in an already quite resistive background. The background resistivity can range from 50-100 ohm-m whereas the reservoir, depending on quality factors, can vary from 100-1000 ohm-m. In order to be economically accessed by surface mining, the reservoir layer must exist within the upper 70 m of earth. A new technique is disclosed that is able to detect resistivity variations between 50 and 1000 ohm m, at depths of 0 to 100 m from the surface.

2. Previous Techniques and Limitations

Current airborne electromagnetic prospecting involves a helicopter or airplane towing a single receiver and single transmitter over a prospect (FIG. 1). The transmitter broadcasts a specific magnetic signal and the magnetic receiver records the magnetic fields resulting from the source signal interacting with the materials of the earth. In FIG. 1, the transmitter is a magnetic coil attached to a helicopter and flown some 30 m above the ground. The transient electric current in the coil generates a primary magnetic field that penetrates the ground and generates electric currents in the conductive sediments. As a result, a secondary magnetic field is generated and recorded by a receiver comprising conductive coils depicted in the drawing. Information about the sediments is captured by the secondary field. This method has predominantly been employed for the identification of precious metal deposits and groundwater characterization. Both of these applications require the detection of a conductive anomaly (0.01-1 ohm m) within a resistive background (>100 ohm m). While this technique allows for the fast collection of data over a broad area, it is limited to one fixed source-receiver offset, and it is also limited by the fact that it must necessarily be vertically distant from the object it is intended to detect. For these reasons, it is not suitable for detecting the hydrocarbon target previously described.

The magnetic signal arising from the relatively resistive hydrocarbon is very weak and likely obscured within the noise level of a receiver flown above ground. FIG. 3 shows a synthetic sensitivity study, performed by the present inventors, where the altitude of the source and receiver was chosen to be comparable with the flight conditions at treetop level. FIG. 3 shows, on the left, sensitivity as a function of source frequency and source-receiver offset, for a resistive target. On the right, FIG. 3 shows sensitivity for a conductive target. The thin solid contour lines in the sensitivity plots (resistive target on the left, conductive target on the right) enclose regions of detectability in the data, i.e., a signal-to-noise ratio (SNR) greater than 1. In both sensitivity plots, the bold dashed vertical line shows the data coverage of current technology, i.e. a single offset and multiple frequencies. FIG. 3 also shows the resistivity models used to generate the synthetic data studies. Thus, it can be seen from FIG. 3 that the current fully airborne electromagnetic prospecting is good for detecting metallic ores (conductive bodies), which is what it was originally designed for, but not good, regardless of frequency or offset, for detecting hydrocarbons (resistive bodies).

Exacerbating the distant-receiver problem is the fact that there is a limited range of frequencies that are both able to be transmitted with significant power, and able to invoke strong enough secondary-field anomaly from the reservoir to be detectable above the magnetic field resulting from the background geology. Geophysical inverse problems (inverting the geophysical data to infer the subsurface physical property model that gave rise to the data) often suffer from the problem of non-uniqueness, the electromagnetic problem especially so. The fewer independent geophysical observations we have, the larger the uncertainty of the recovered image of the subsurface will be. In this case, the narrower the frequency range of sensitivity to the reservoir, the weaker the constraints on the pertinent parameters of the reservoir target (e.g. aerial distribution, thickness, resistivity, depth of burial).

In order to address some of the issues, a different approach was considered by some research groups. Some relevant publications include:

U.S. Pat. No. 5,610,523, 1997 to P. J. Elliot, "Comparison of data from airborne, semi-airborne, and ground electromagnetic systems;"

R. S. Smith, et al., "Method and apparatus of interrogating a volume of material beneath the ground including an airborne vehicle with a detector being synchronized with a generator in a ground loop," *Geophysics* 66, 1379-1385 (2001); and T. Mogi, et al., "Grounded electrical-source airborne transient electromagnetic (GREATEM) survey of Mount Bandai, north-eastern Japan," *Exploration Geophysics* 40(1), 1-7 Published online: 27 Feb. 2009.

Elliot's patent proposes a method of interrogating a volume of underground material located beneath a grounded loop transmitter whose transient electromagnetic signal is picked up by a receiver attached to an aircraft. Smith et al. considered an experimental semi-airborne system with a source loop placed on the ground and an airborne receiver, and investigated how the signal-to-noise level compares with the case of an earth-bounded survey and an airborne one. Mogi et al. used the semi-airborne technology with a grounded transient electromagnetic source and an airborne receiver for investigating volcanic structures.

All three of the above publications propose a semi-airborne survey method that places the source on the ground while the receiver is attached to an aircraft. Although this approach addresses some of the shortcomings of the existing technology, in particular the acquisition of multiple-offset data, the low signal-to-noise ratio for resistive targets remains a problem. With the sensitive receiver placed on a moving platform, much higher noise is generated through motional induction, than would be experienced in a stationary receiver on the ground, relative to the small signal from the reservoir. Conversely, the anomalous currents that might be induced through motion of the transmitter would be orders of magnitude smaller than the known current that drives it. In addition, the existing semi-airborne approach, by pinning a singular transmitter to the ground does not allow for the economical collection of data from multiple, sequential source locations. There is a need for a technique that mitigates the problems of weak reservoir signal relative to receiver noise and lack of constraints on the data inversion. The present inventive method satisfies this need.

SUMMARY OF THE INVENTION

In one embodiment, the present invention is a method for semi-airborne electromagnetic prospecting for hydrocarbons (or other fluids or minerals), comprising, referring to the flowchart of FIG. 5, (step 51) deploying a plurality of electromagnetic receivers on the Earth's surface over a subsurface region; (step 52) energizing an airborne electromagnetic transmitter, preferably a magnetic dipole, in a vicinity above the receivers; (step 53) recording at least one component of electromagnetic field data excited by the transmitter in the receivers; (step 54) analyzing the recorded data for subsurface resistivity; and (step 55) interpreting the resistivity for evidence of hydrocarbons (or other fluids or minerals).

BRIEF DESCRIPTION OF THE DRAWINGS

The advantages of the present invention are better understood by referring to the following detailed description and the attached drawings, in which.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

In order to solve these problems of weakness in reservoir signal, and paucity in constraints, a technique is disclosed for the collection of electromagnetic recordings at many different source-receiver offsets on the earth's surface.

Figure 1:
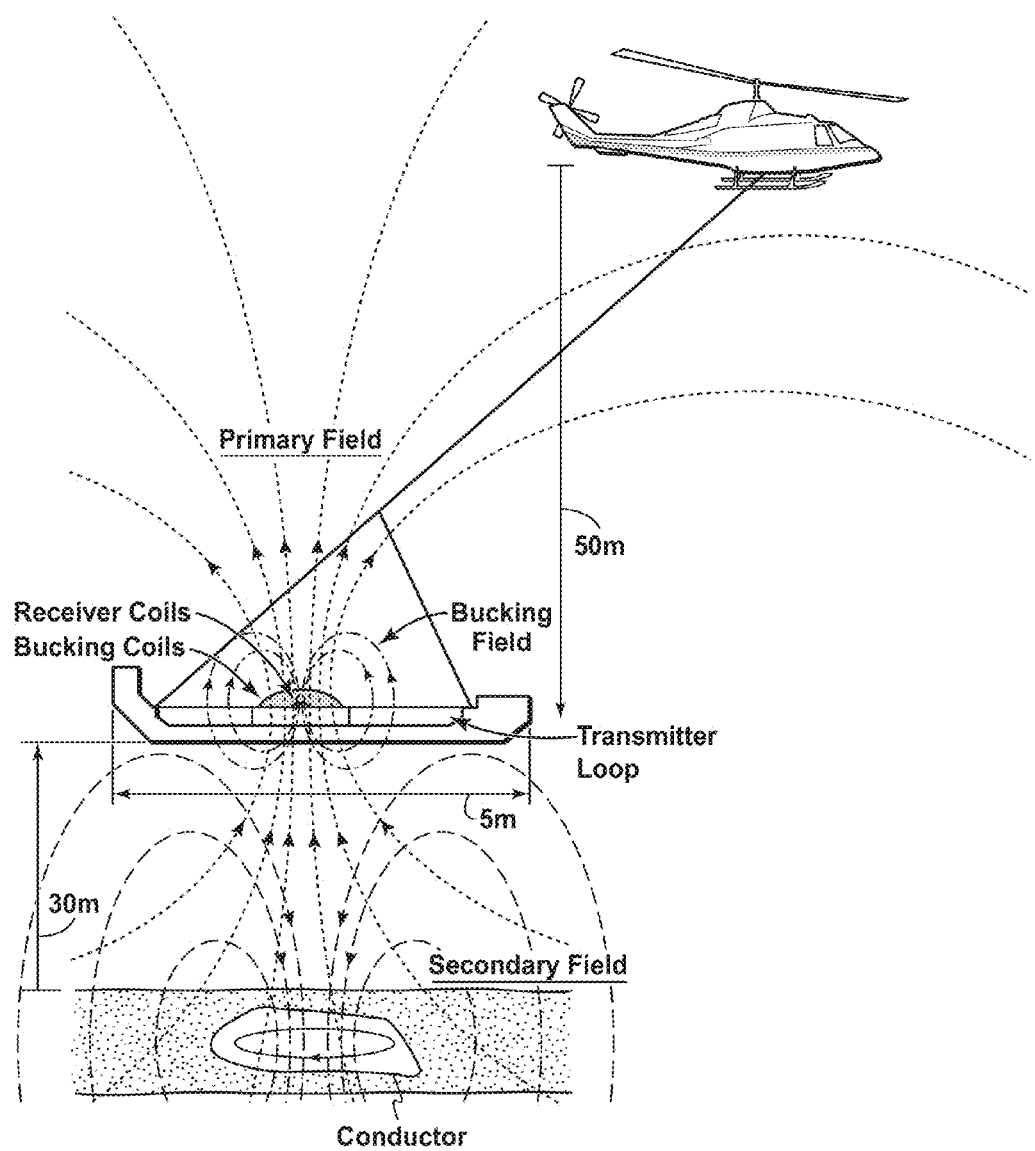
FIG. 1 is a schematic diagram showing airborne electromagnetic ("EM") data being collected using existing technology, where both the source and the receiver are attached to a helicopter acquiring a data set that is limited to a single source-receiver offset.
Figure 2:
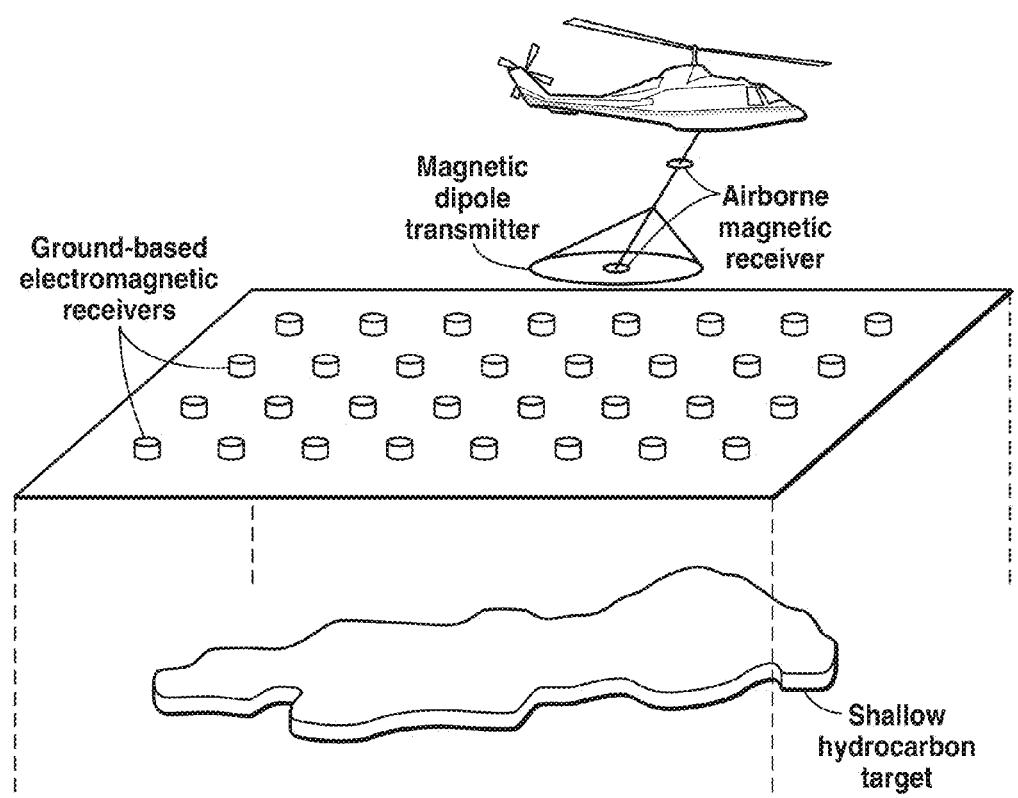
FIG. 2 is a schematic diagram illustrating how semi-airborne EM data may be collected using the present invention, where the source is still attached to a helicopter but the receivers are placed on the ground acquiring an enhanced signal data set featuring multiple source-receiver offsets.

The present invention involves the airborne towing of a magnetic source by an aircraft flown above the survey area. In preferred embodiments of the invention, the source is a magnetic dipole, oriented horizontally or vertically. (An electric source such as an electric dipole will be unsatisfactory because it will not be able to efficiently transfer the field energy into the subsurface due to the air/ground interface acting like a Faraday cage and insolating the subsurface from the airborne electric fields.) An array of receivers is placed on the earth's surface in the survey area, as shown in FIG. 2, with a spacing that may be determined at least partly based on economics. The receiver could perform either magnetic field measurements or electric field measurements, or both measurements at the same time. The airborne source could be either a time-domain or a frequency-domain system, with the latter requiring that the helicopter or airplane is moving slowly relative to the time it takes for the receivers to record several cycles of earth response. If a frequency-domain source is chosen, the airborne magnetic source may broadcast a waveform with frequency content based on feasibility studies prior to the survey, typically between 50 Hz and 100 kHz, and the receivers will sample the resulting field at a rate with a Nyquist frequency sufficiently higher than the highest transmitted frequency. All receivers and the transmitter may be synchronized through GPS timing or the synchronization could be established at a later processing time.

Because the receivers are placed on the ground, and only the source is airborne, the present inventive method may be referred to as reverse semi-airborne electromagnetic prospecting, the word reverse referring to the fact that in the existing semi-airborne electromagnetic prospecting (examples discussed above), the source is on the ground and the receiver is airborne. Although not part of the present invention, FIG. 2 includes an airborne electromagnetic receiver as might be used in current airborne electromagnetic prospecting.

Figure 3:
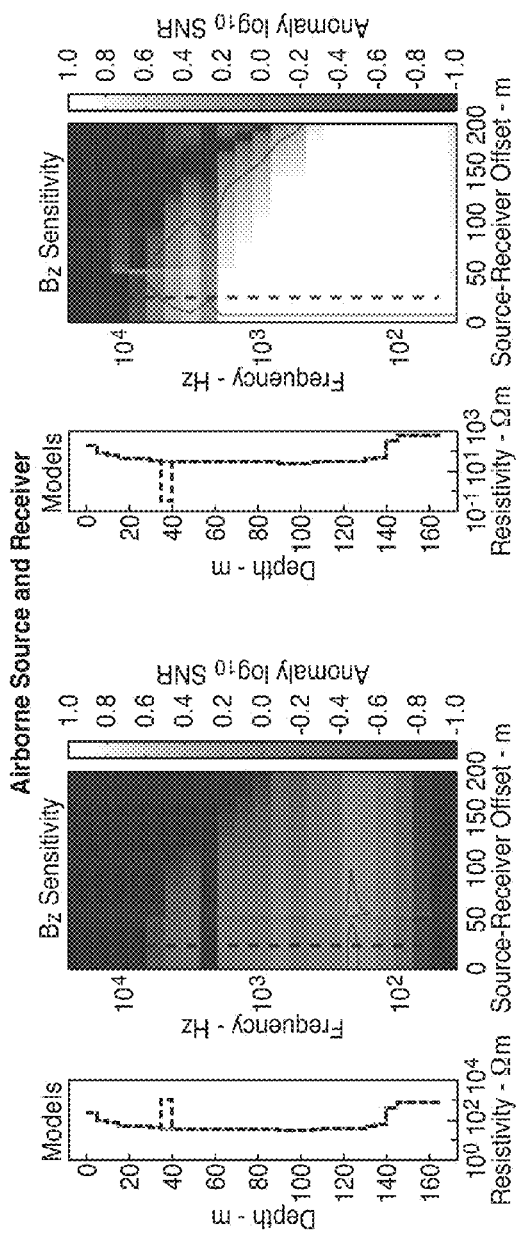
FIG. 3 is a conversion to gray scale of a color data display, shows displays of sensitivity to a resistive target (left) and sensitivity to a conductive target (right) for a conventional, fully airborne (both source and receiver airborne) survey.
Figure 4:
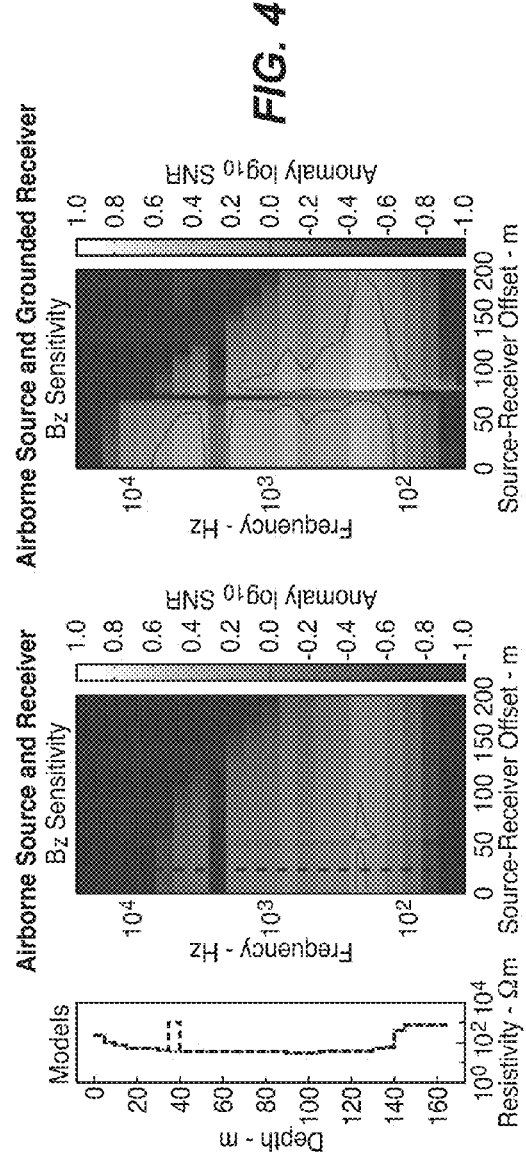
FIG. 4, also a conversion to gray scale of a color data display, compares resistive target sensitivity for an airborne receiver (left) compared to a ground receiver (right)

The benefits of the present invention are particularly useful for shallow hydrocarbon exploration. Now the receivers are significantly closer to the target creating the anomalous field, thereby rendering its signal detectable above the noise level. This is demonstrated in FIG. 4. The thin solid contour lines in the sensitivity plots (airborne receiver on the left, ground receiver on the right) enclose regions in which the lighter shading indicates detectability in the data, i.e., a signal-to-noise ratio (SNR) greater than 1. (FIG. 4 also shows the resistivity model used to generate the synthetic data studies.) In the left sensitivity plot, the bold dashed vertical line shows the data coverage of the current all-airborne technology (single offset, multiple frequencies). In the right-hand panel in FIG. 4, showing resistive target sensitivity for a ground receiver, there are large zones in the offset-frequency domain representing signal that is detectable above the noise level. This may be compared to the left-hand panel of FIG. 4 (this is the same display as the left-hand panel in FIG. 3) showing resistive target sensitivity for an airborne receiver and airborne transmitter. It can be seen that there are very limited combinations of source frequency and source-receiver offset that will yield signal detectable above noise levels for the airborne receiver. Also, placing the multiple receivers on the ground provides a greater richness of independent measurements by introducing the ability to simultaneously record more than one source-receiver offset over multiple, sequential source locations. The final advantage afforded by this technique is the significant reduction in noise by having the receiver stationary on the ground, which removes the problem of induction by translation and rotation of the receiver in a spatially variable magnetic field.

Once acquired, the raw data may be subject to a processing workflow including: GPS and amplitude corrections, de-spiking, de-noising, drift-corrections etc. These are standard industry processing steps and an overview of these steps is detailed in Nicholas C. Valleau's paper (Nicholas C. Valleau, "HEM data processing—a practical overview," *Exploration Geophysics* 31, 584-594 (2000)). Although the raw data are a time series, in practice the data are commonly interpreted in the temporal frequency domain. The frequency domain data is generated by "binning" the time domain data in intervals equal with the period of the transmitted waveform and extracting the dominant frequencies by means of Fourier Transform (FT). At this stage a time to depth transformation can be carried out by means of modeling (see, for example, Gregory A. Newman and David L. Alumbaugh, "Frequency-domain modeling of airborne electromagnetic responses using staggered finite differences," *Geophysical Prospecting* 43, 1021-1042, (1995)) and inversion. The airborne EM data included in the inversion can be substantially larger than other airborne EM data previously used in inversion calculations because of the multi-offset nature of the proposed data. Although this data redundancy carries a computational overhead, it also enriches the measured data set providing an important advantage over existing methods. The mechanics of the inversion may be identical to that described in any of several references on CSEM (Controlled Source EM) iterative inversion, for example Gregory A. Newman, Michael Commer, and James J. Carazzone, "Imaging CSEM data in the presence of electrical anisotropy," *Geophysics* 75, F51-F61 (2010), with the exception that the transmitter and receivers are immersed in air instead of water. See PCT International Patent Application WO 08/033184, "Rapid inversion of electromagnetic reconnaissance survey data," by Jing, et al., for a particularly efficient method of inversion. Converged inversions provide subsurface resistivity volumes which are used for integrated geological interpretation.

Figure 5:
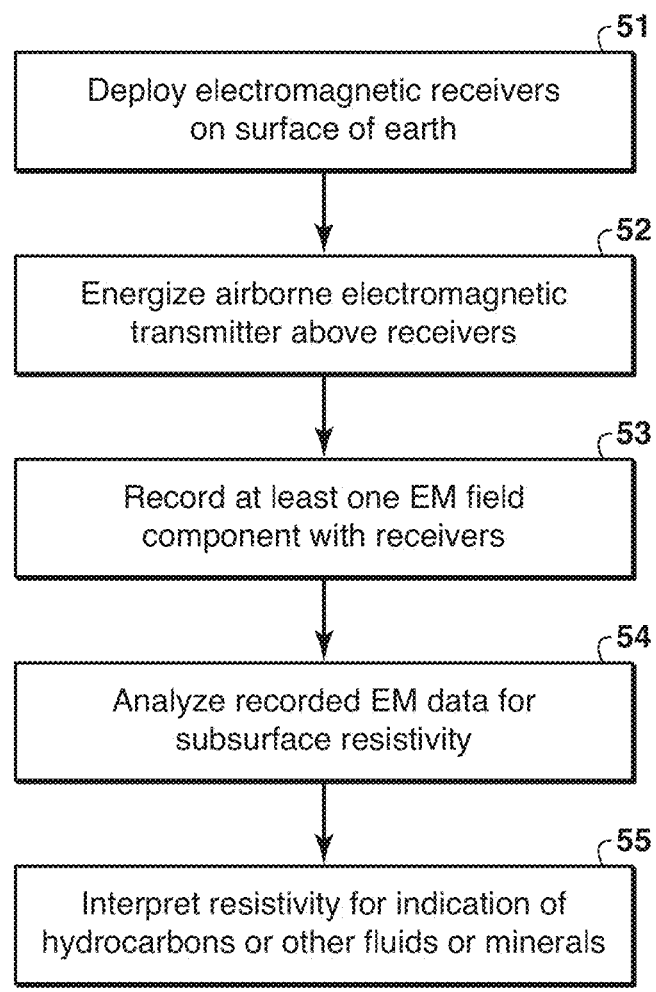
FIG. 5 is a flow chart showing basic steps in one embodiment of the method of the present invention.

In a preferred embodiment, basic steps of the present inventive method, summarized in the flowchart of FIG. 5, are as follows:
1. Deploy a plurality of electromagnetic receivers on the earth's surface;
2. Energize an airborne electromagnetic transmitter in the vicinity of said receivers;
3. Record at least one component of electromagnetic field data excited by said transmitter in said receivers;
4. Analyze said data for subsurface resistivity;
5. Interpret the resistivity for evidence of mineral or hydrocarbon accumulation;

In many embodiments of the invention, the survey source, i.e. the electromagnetic transmitter, will be a magnetic dipole, which can be oriented either horizontally or vertically. The electromagnetic receivers may be directional magnetometers, having 1, 2, or 3 axes depending upon how many components of the magnetic field vector one wants to measure. The receivers and transmitters may be linked to a GPS for synchronization and location purposes. The receivers may be placed on the ground in a variety of ways, including by dropping a robust package from an aircraft, or by lowering to the ground from an aircraft, or placing them by a ground-based operation.

Those skilled in the art of Airborne EM data acquisition would find it straightforward to carry out a survey as described above, and will appreciate the gain in the signal level as a result of the more suitable survey geometry afforded by the present inventive method.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

The invention claimed is:

1. A method for semi-airborne electromagnetic prospecting for fluids or minerals, comprising:
deploying a plurality of electromagnetic receivers on the Earth's surface over a subsurface region;
energizing an airborne electromagnetic transmitter in a vicinity above the receivers;
recording at least one component of electromagnetic field data excited by the transmitter in the receivers, wherein the electromagnetic transmitter transmits, and the receivers record, multiple frequencies for a single offset;
analyzing the at least one component of electromagnetic field data generated from the semi-airborne electromagnetic prospecting for subsurface resistivity; and
interpreting the resistivity for evidence of hydrocarbons.

2. The method of claim 1, wherein the electromagnetic transmitter is a magnetic dipole.

3. The method of claim 2, wherein the magnetic dipole is oriented either horizontally or vertically.

4. The method of claim 2, wherein the magnetic dipole is oriented horizontally.

5. The method of claim 1, wherein the electromagnetic receivers are directional magnetometers, measuring one or more vector components of magnetic field.

6. The method of claim 1, wherein the transmitter and receivers are linked to a global positioning satellite for synchronization and location purposes.

7. The method of claim 1, wherein the deploying of receivers is accomplished by one of (a) dropping from an aircraft; (b) lowering to the ground from an aircraft; and (c) placing by a ground-based operation.

8. The method of claim 1, wherein the transmitter is towed above the subsurface region by an airplane or helicopter.

9. The method of claim 1, wherein the receivers are deployed in a regular array.

10. The method of claim 1, wherein the analyzing comprises inverting the recorded data to infer a resistivity model of the subsurface region.

* * * * *